United States Patent [19]

Morley et al.

[11] 4,131,691

[45] Dec. 26, 1978

[54] COATING A SUBSTRATE BY GLOW DISCHARGE GRAFT POLYMERIZATION

[75] Inventors: John R. Morley, Oakland, Calif.; Ralph E. Howe, Cold Spring Harbor, N.Y.

[73] Assignee: Surface Activation Corporation, Syosset, N.Y.

[21] Appl. No.: 835,657

[22] Filed: Sep. 22, 1977

[51] Int. Cl.$^2$ ............................................. B05D 3/06
[52] U.S. Cl. ..................................... 427/41; 204/165
[58] Field of Search .................... 427/38, 39, 40, 41; 204/164, 165, 168

[56] References Cited

U.S. PATENT DOCUMENTS

| | | | |
|---|---|---|---|
| 3,600,122 | 8/1971 | Coleman | 427/40 |
| 3,944,709 | 3/1976 | Levy | 427/41 |
| 3,959,104 | 5/1976 | Fales | 204/164 |
| 3,968,270 | 7/1976 | Hasegawa | 427/40 |
| 4,072,769 | 2/1978 | Lidel | 427/40 |

*Primary Examiner*—John H. Newsome
*Attorney, Agent, or Firm*—Jacobs & Jacobs

[57] ABSTRACT

A method of coating a substrate in an electrical discharge plasma, which comprises establishing a zone of electrical glow discharge plasma in a gaseous medium comprising at least about 25%, by weight, of water vapor, based on the total weight of the gaseous medium, and exposing said substrate to said plasma in said zone then exposing the substrate to an ethylenically unsaturated monomer whereby the monomer is grafted onto the substrate.

5 Claims, No Drawings

COATING A SUBSTRATE BY GLOW DISCHARGE GRAFT POLYMERIZATION

The present invention relates to method and apparatus for treating a substrate with an electrical discharge plasma, and more particularly with a low pressure glow discharge plasma.

A low pressure glow discharge consists of a uniform dispersion, on a molecular level, of glowing electrical discharge plasma in undissociated gas. Conventionally, the electrical discharge occurs at a pressure of from about 0.001 to about 100 Torr, although pressures of about 0.1 Torr to about 10 Torr are preferred, in activating gases, such as hydrogen, nitrogen, the inert gases of Group VIII of the Periodic Table, and mixtures thereof. The electrical discharge is preferably carried out in a gas at ambient temperature, although lower or elevated temperatures may be used. See Fales U.S. Pat. No. 3,959,104, issued May 25, 1976.

Through the use of the apparatus described in U.S. Pat. No. 3,959,104, it is now possible to treat commercially wide webs on a continuous basis. For example, web material up to 72 inches wide has been continuously treated in an electrical glow discharge in argon at about 1 Torr at the rate of about 50 yards per minute.

When treating a substrate with an electrical discharge plasma, problems can occur relating to inhomogeneity of the plasma. One cause of inhomogeneity is higher local levels of water vapor in the activating gas used as the medium for the glow discharge.

Local high concentration of water vapor can be caused by desorption of water from the substrate by the action of the glow discharge itself. It is well known that exposing substrates to glow discharges causes the rapid removal of surface contaminants such as water vapor. Thus, a higher concentration of water vapor can be expected at the entry end of the electrode section, lowering the plasma density which exists at the entrance as compared to the plasma density at the exit end of the electrode structure. There is thus an end-to-end variation in plasma density. One possible solution is to adjust the operating voltage on separate sets of electrodes, but unfortunately this is a complex and expensive solution. Another possibility is to increase the flow of activating gas to dilute the water vapor to acceptable levels; but, again, this is an expensive, wasteful and unreliable solution.

Local high concentration of water vapor is also caused by the drying techniques used in the prior processing of the web material. For example, with the drying methods used in commercial processing, the residual water concentration across the width of a polyester web can vary from 0.1% to 0.3%, by weight, of water. Under the processing condition of 1 Torr, this difference (0.2%) of water is equivalent to 30 cubic feet of water vapor per pound of web material, which, at a process speed of 50 yards per minute, is equivalent to about 1,000 cubic feet of water vapor released per minute. This variation is much more than sufficient to extinguish locally the glow discharge, thus causing a lack of treatment in that area. Indeed, when the local concentration of water vapor exceeds 25 parts by weight per 1,000 parts by weight of activating gas, then in that region of high water vapor concentration, the discharge is not visible to the eye. Plasma probe measurements confirm that there is a great reduction in positive ion concentration where the water vapor local concentration is high.

Polyester material has a small water regain as compared, for example, to a material such as nylon, where the regain can approach 5%. In such a case, the variation across the width is therefore much greater than that cited for polyester, and the problems due to release of water vapor are more severe.

It is thus an object of the invention to provide an improved process for treating a substrate with a glow discharge plasma that avoids the problems associated with higher local concentrations of water vapor.

It is another object of the invention to provide an improved, continuous treatment of a substrate with a glow discharge plasma.

These and other objects of the invention are fulfilled by the present invention, which provides a method of treating a substrate with an electrical discharge plasma, which comprises establishing a zone of electrical glow discharge plasma in a gaseous medium containing at least about 25%, by weight, of water vapor based on the total weight of the gaseous medium, and exposing said substrate to said plasma in said zone.

Previously, the gases used for the formation of the glow discharge plasma were those that would partially dissociate and support the electrical discharge, but would not react at the active sites produced in the substrate. Inert gases, such as argon and helium were thus commonly used. The prior art does disclose the use of oxygen or air as the gaseous medium for processes that do not depend upon the presence of free radicals on the substrate, but these gases are unsuitable for use where free radicals are desired to be created by the electrical discharge treatment. It is well known that even small concentrations of oxygen will react at the active sites to form peroxides, thus destroying any free radicals that may have been formed. Since the presence of free radical sites are required for subsequent grafting of a monomer, such as acrylic acid, to the substrate, the prior art has avoided the use of oxygen or air as the gaseous medium where grafting must take place. See Coleman, U.S. Pat. No. 3,600,122, issued Aug. 17, 1971.

Water vapor partially dissociates into oxygen, hydrogen and hydroxyl ions during the electrical discharge and it was thus quite unexpected to discover that water vapor could be used as the gaseous medium in an electrical glow discharge where there was no appreciable or deleterious destruction of free radicals by peroxide formation. In fact, it has been found that the gaseous medium can even consist essentially of water vapor.

After the electrical glow discharge treatment, the substrate can be used as such or further processed in any manner known in the art. Preferably, the substrate is treated after the electrical discharge with a substance that reacts with the free radical sites thereon. Preferably, the substrate containing free radical sites is contacted with an ethylenically unsaturated monomer, such as an olefin or an unsaturated carboxylic acid or the like, to graft the monomer or a polymer thereof to the substrate. Grafting acrylic acid on the substrate will impart hydrophillicity to an essentially hydrophobic substrate, such as a polyester. Coleman, U.S. Pat. No. 3,600,122, describes the grafting process, and is incorporated herein by reference thereto.

While the advantages of the present invention are most fully appreciated in a continuous process, batch operation or semi-continuous operation may also be employed.

The use of water vapor as the gaseous medium for the electrical discharge provides a greater stability and an insensitivity to local higher concentrations of water vapor. A small change in local water vapor concentration due to the local release of water vapor from the moving web will have an infinitesmal effect upon the voltage of the discharge. In turn, this means that the electrical discharge continues to operate and is not locally extinguished as is the case for a local high concentration of water vapor in conventional systems using argon or other activating gas. This is a most important consideration for commercial processing of wide web materials. Commercial drying of wide web material every day of the year when the humidity and plant process conditions vary means a variation of water content in the web. Not only does the 'bulk' water content change, but also the 'local' water content varies, too, both along and across the web. Under argon discharge conditions at a pressure of about 1 Torr, a web weighing 0.5 pounds per linear yard, and moving at 50 yards per minute will extinguish the glow discharge locally when the local water content is 10% higher than the neighboring areas. Thus, if the average water content is 0.1%, then when the local concentration is 0.11% or more the discharge will locally extinguish itself. However, when water vapor is used as the gaseous medium, with the above web conditions, no effect upon the discharge is observed. It would need a pressure change locally of more than a full Torr to have even a small effect, and that is just about an impossibility in a well pumped and large vacuum system operating under discharge conditions.

The use of water vapor as the gaseous medium also effects substantially economies in the overall system because higher operating pressures can be used. Conventionally, glow discharge is effected at about 1 Torr in argon. As the operating pressure is increased, the size of the vacuum pumps, or their pumping capacity, can be reduced, resulting in a considerable monetary saving on a commercial size installation. Since a discharge in a gaseous medium consisting of 100% water vapor is stable to at least 5 Torr, and is not affected by local higher pressures of water vapor due to desorption, considerable savings in pumping equipment can be achieved. Again, at the higher pressures that water vapor discharges will operate at, this means that less water is desorbed, which in turn means a further reduction in necessary pumping equipment.

The use of water vapor as the gaseous medium also gives rise to economies in the overall electrical discharge/grafting process because lower web temperatures can be obtained. Where the electrical discharge treatment is followed by grafting a monomer onto the substrate, the monomer should be at a temperature equal to or no more than 10% lower than the substrate. With an electrical discharge in argon, where the optimum discharge pressure for stability was about 1 Torr, the final temperature for the web was determined by the amount of water desorbed. Since little or no water was permitted in that process because of the deleterious effects described above, little or no temperature control could be exercised by adjusting the residual water content to employ evaporative cooling. The consequence of this was a relatively higher temperature of the web. This in turn demanded a higher monomer pressure, e.g. the pressure of the monomer had to be maintained at pressures up to 10 Torr above the discharge pressure, in order to control the grafting process. This led to large leakage of monomer through the seals, due to the large pressure difference. Reduction of this pressure difference gives substantial monetary savings and can be effected by controlling the web temperature to a lower value than was possible with the pure argon process.

Since a higher water content can be permitted in the web with a water vapor discharge, a lower web temperature can be achieved, and hence a lower pressure of monomer is permissible, thus reducing monomer leakage at the seals. Further, temperature adjustment of the web is possible by adjusting the total pressure of the discharge section. If the web is particularly damp, then less water will be desorbed if the discharge pressure is increased. This results in being able to adjust the web temperature so that the pressure differential between the discharge section, and the grafting section is as low as possible with the resultant saving in monomer consumption.

The present invention is carried out as in a conventional electrical glow discharge treatment, as described above, except that the gaseous medium is water vapor, or at least about 25%, preferably about 50 to about 100%, water vapor. A detailed description of an electrical glow discharge process appears in U.S. Pat. No. 3,959,104 and the literature and patents referred to therein.

Desirably, the discharge chamber is evacuated to below the operating pressure, and water vapor is introduced to bring the pressure to the chosen pressure, after which the glow discharge is established and the substrate passed through the resulting plasma. Additional water vapor to maintain the gaseous discharge medium can come from the water desorbed from the substrate and/or from an external source. If another gas is to be used in admixture with the water vapor, it is charged to the chamber along with the initial charge of water vapor, and added from an external source as needed.

Preferably, the gaseous discharge medium consists essentially of water vapor, but any other dissociable gas can be used, such as those specified in U.S. Pat. No. 3,600,122. If other gases are used, the water vapor must be at least about 25%, preferably at least about 50%, by weight, of the total weight of the gaseous medium.

The present invention is illustrated by the following Examples.

EXAMPLE 1

A nylon carpet, 2 feet wide by 15 feet long, was fed into a vacuum vessel containing an electrode structure according to FIGS. 11 and 12 of U.S. Pat. No. 3,959,104 at a speed of 5 feet per minute. During its passage through the vessel, the carpet was continuously treated for 24 seconds in an electrical plasma at 1 Torr in a gaseous medium consisting of 50% by weight argon and 50% by weight water vapor.

After the electrical plasma treatment, the carpet was then exposed to acrylic acid vapor at a pressure of 4 Torr. The result was a permanent surface graft of polyacrylic acid (0.21% by weight) on the carpet giving excellent soil release properties (rated 2.0 on a scale of 1.0 to 10.0, wherein the lower the number the better the performance).

EXAMPLE 2

Example 1 was repeated except that the gaseous medium for the electrical plasma consisted entirely of water vapor and the pressure was 0.9 Torr, and the carpet was fed through the vacuum vessel at 1 foot/minute for a residence time in the electrical plasma of 15 seconds. The permanent surface graft of polyacrylic acid was 0.12% and was rated 2.4.

What is claimed is:

1. A method of graft polymerizing a monomer on a substrate, comprising passing a substrate through a zone of electrical glow discharge plasma in a gaseous medium comprising at least about 25%, by weight, of water vapor, based on the total weight of the gaseous medium, thereby exposing said substrate to said plasma in said zone to generate free radical sites on said substrate, and subsequently exposing the substrate containing said free radical sites to an ethylenically unsaturated monomer to form a graft polymer thereof on said substrate.

2. The method according to claim 1, wherein said zone has an inlet and an outlet, and said substrate is passed continuously through said plasma in said zone from said inlet to said outlet.

3. The method according to claim 2, wherein said gaseous medium comprises about 50 to about 100%, by weight, of water vapor.

4. The method according to claim 1, wherein said gaseous medium consists essentially of water vapor.

5. The method according to claim 1, wherein said zone is at a pressure of less than about 10 Torr.

* * * * *